(12) United States Patent
Rob et al.

(10) Patent No.: US 10,253,751 B2
(45) Date of Patent: Apr. 9, 2019

(54) WIND TURBINE BLADE ASSEMBLED FROM INBOARD PART AND OUTBOARD PART HAVING DIFFERENT TYPES OF LOAD CARRYING STRUCTURES

(71) Applicant: LM WP PATENT HOLDING A/S, Kolding (DK)

(72) Inventors: Fons Rob, Kolding (DK); Jesper Madsen, Gesten (DK); Flemming Ejlersen, Vejle (DK); Peter Quiring, Rodding (DK)

(73) Assignee: LM WP PATENT HOLDINGS A/S, Kolding (DK)

( * ) Notice: Subject to any disclaimer, the term of this patent is extended or adjusted under 35 U.S.C. 154(b) by 636 days.

(21) Appl. No.: 14/366,355

(22) PCT Filed: Dec. 20, 2012

(86) PCT No.: PCT/EP2012/076395
§ 371 (c)(1),
(2) Date: Jun. 18, 2014

(87) PCT Pub. No.: WO2013/092871
PCT Pub. Date: Jun. 27, 2013

(65) Prior Publication Data
US 2014/0334930 A1  Nov. 13, 2014

(30) Foreign Application Priority Data
Dec. 22, 2011 (EP) .................................... 11195225

(51) Int. Cl.
*F01D 5/14* (2006.01)
*F03D 1/06* (2006.01)
(Continued)

(52) U.S. Cl.
CPC ......... *F03D 1/0675* (2013.01); *F03D 1/0633* (2013.01); *F03D 7/04* (2013.01);
(Continued)

(58) Field of Classification Search
CPC ...................................................... F03D 1/0675
See application file for complete search history.

(56) References Cited

U.S. PATENT DOCUMENTS 4,355,955 A * 10/1982 Kisovec ................ F03D 7/0252
416/132 B
4,533,297 A * 8/1985 Bassett ................ F03D 1/0658
416/11
(Continued)

FOREIGN PATENT DOCUMENTS

EP  2378115 A2  10/2011
FR  2575970 A1   7/1986
(Continued)

*Primary Examiner* — Woody Lee, Jr.
*Assistant Examiner* — Jason Fountain
(74) *Attorney, Agent, or Firm* — Nath, Goldberg & Meyer; Jerald L. Meyer; Tanya E. Harkins

(57) ABSTRACT

A blade (10) for a rotor of a wind turbine (2) is disclosed. The blade is assembled from an inboard blade part (50) closest to the hub and an outboard blade part (110) farthest from the hub of the wind turbine. The inboard part (50) comprises a load carrying structure (60) with a first aerodynamic shell (70) fitted to the load carrying structure (60), and the outboard part (110) comprises a blade shell (141, 143) with a load carrying structure (142, 144) integrated in the blade shell (141, 143).

15 Claims, 6 Drawing Sheets

(51) Int. Cl.
*F03D 7/04* (2006.01)
*F03D 7/02* (2006.01)

(52) U.S. Cl.
CPC ........ *F03D 7/0228* (2013.01); *F05B 2230/60* (2013.01); *F05B 2240/302* (2013.01); *F05B 2250/314* (2013.01); *F05B 2260/79* (2013.01); *Y02E 10/721* (2013.01); *Y02P 70/523* (2015.11); *Y10T 29/49337* (2015.01)

(56) References Cited

U.S. PATENT DOCUMENTS

| | | | |
|---|---|---|---|
| 7,204,674 B2 * | 4/2007 | Wobben | F03D 1/0641 416/1 |
| 7,381,029 B2 * | 6/2008 | Moroz | F03D 1/001 416/132 B |
| 7,891,947 B2 * | 2/2011 | Chen | F03D 1/0675 416/225 |
| 7,994,650 B2 * | 8/2011 | Stommel | F03D 1/0675 290/44 |
| 8,096,778 B2 * | 1/2012 | Llorente Gonzalez | B29C 70/44 264/257 |
| 8,376,703 B2 * | 2/2013 | Carroll | F03D 1/0675 416/23 |
| 8,622,707 B2 * | 1/2014 | Mashue | F03D 1/0658 416/204 R |
| 8,789,275 B2 * | 7/2014 | Esaki | F03D 1/0675 29/889.7 |
| 8,915,714 B2 * | 12/2014 | Grabau | F03D 1/0641 415/140 |
| 2008/0124216 A1 | 5/2008 | Liao | |
| 2009/0148291 A1 * | 6/2009 | Gerber | F03D 1/0658 416/147 |
| 2011/0142636 A1 * | 6/2011 | Curtin | F03D 1/0658 416/62 |
| 2011/0206529 A1 | 8/2011 | Bell et al. | |

FOREIGN PATENT DOCUMENTS

| | | |
|---|---|---|
| WO | 03008800 A1 | 1/2003 |
| WO | 03060319 A1 | 7/2003 |
| WO | 2008092451 A2 | 8/2008 |
| WO | 2010048370 A1 | 4/2010 |
| WO | 2011006732 A1 | 6/2010 |
| WO | 2011067323 A2 | 6/2011 |

* cited by examiner

WIND TURBINE BLADE ASSEMBLED FROM INBOARD PART AND OUTBOARD PART HAVING DIFFERENT TYPES OF LOAD CARRYING STRUCTURES

This is a National Phase Application filed under 35 U.S.C. 371 as a national stage of PCT/EP2012/076395, filed Dec. 20, 2012, and claims priority benefit from European Patent Application No. 11195225.5, filed Dec. 22, 2011, the content of each of which is hereby incorporated by reference in its entirety.

TECHNICAL FIELD

The present invention relates to a wind turbine blade assembled from an inboard blade part and an outboard blade part. Further, the invention relates to a wind turbine comprising such wind turbine blades as well as a method of manufacturing or assembling such a wind turbine blade.

BACKGROUND

Ideally, a wind turbine blade of the airfoil type is shaped similarly to the profile of an aeroplane wing, where the chord plane width of the wind turbine blade as well as the first derivative thereof increase continuously with decreasing distance from the hub.

This results in the blade ideally being comparatively wide in the vicinity of the hub. This again results in problems when having to mount the wind turbine blade to the hub, and, moreover, this causes great loads during operation of the wind turbine blade, such as storm loads, due to the large surface area of the wind turbine blade.

Therefore, over the years, construction of wind turbine blades has developed towards a shape, where the wind turbine blade consists of a root region closest to the hub, an airfoil region comprising a lift-generating profile furthest away from the hub and a transition region between the root region and the airfoil region. The airfoil region has an ideal or almost ideal profiled contour shape with respect to generating lift, whereas the root region has a substantially circular cross-section, which reduces the loads and makes it easy and safe to mount the wind turbine blade to the hub. The root region diameter may advantageously be constant along the entire root region. Due to the circular cross-section, the root region does not contribute to the energy production of the wind turbine and, in fact, lowers this a little because of drag. As it is suggested by the name, the transition region has a shape gradually changing from the circular shape of the root region to the airfoil profile of the airfoil region. Typically, the width of the wind turbine blade in the transition region increases substantially linearly with increasing distance from the hub.

When the wind turbine blade is impacted by incident airflow, the profiled contour generates a lift. When the wind turbine blade is mounted on a wind turbine, the wind turbine hub begins to rotate due to the lift. Incident flow is here defined as the inflow conditions at a profiled contour section during normal use of the wind turbine blade, i.e. rotation on a wind turbine rotor. Thus, the incoming flow is the inflow formed by the resultant of the axial wind speed and the rotational component, as it is seen by the local section of the profiled contour.

As for instance wind turbine blades for wind turbines have become increasingly bigger in the course of time and may now be more than 70 meters long, the demand for optimised aerodynamic performance has increased. The wind turbine blades are designed to have an operational lifetime of at least 20 years. Therefore, even small changes to the overall performance of the wind turbine blade may accumulate over the lifetime of a wind turbine blade to a high increase in financial gains, which surpasses the additional manufacturing costs relating to such changes.

As the requirement for effectiveness of a wind turbine is increased, there is a need for increasing the effectiveness or performance of wind turbines or wind turbine blades.

However, the increase in blade length also imposes challenges to all stages involved in the manufacturing and installment of the wind turbine blades; the moulds for manufacturing blade parts such as blade shells are becoming longer, higher and heavier, which means that the manufacturing halls have to be longer and need to have a higher clearance to the ceiling, the turning mechanisms used for assembling blade shells have to be more powerful or additional turning apparatuses have to be used; it becomes increasingly difficult to transport the blades and the logistics of transporting the blades have to be planned in detail; the installment of the blades on a wind turbine becomes increasingly difficult; and the wind turbine itself needs to be dimensioned for the higher rotor mass as well as having more powerful pitch bearings and motors to pitch the heavier blades.

US 2011/0206529 describes a spar assembly for a rotor blade of a wind turbine. The spar assembly comprises a first spar cap that is disposed adjacent to a first interior surface of the shell and a second spar cap that is disposed adjacent to a second interior surface of the shell. In one embodiment, the assembly is divided into two longitudinal sections, the inner assembly being a tubular assembly and the outer assembly being a C-shaped assembly. However, the type of spar cap does not vary in the longitudinal direction of the blade. Further, the blade shell is manufactured as a single piece.

US 2008/0124216 discloses a turbine blade assembly with a plurality of blades mounted on a central rotor. Each of the blades has a proximal section and a variable pitch section.

EP 2 378 115 discloses a blade with a configurable winglet. In one embodiment, the winglet comprises a pitch axis which is angled compared to a longitudinal axis of the blade itself so that the angle of the winglet may be varied compared to the rotor plane.

WO 03/060319 discloses a wind turbine provided with a hub extender. The hub extender comprises a first flange attached to the hub of the blade, and a second flange for attaching a rotor blade. The planes of the flanges form an acute angle so that the rotor blade when mounted to the hub extender is angled away from the tower of the wind turbine.

WO 2011/0067323 discloses a sectional blade for a wind turbine and comprising a first blade section and a second blade section. The two blade sections are attached to each other via a spar bridge in an interlocking way so that the two blade sections are fixed in relation to each other.

DISCLOSURE OF THE INVENTION

Therefore, it is an object of the invention to obtain a new wind turbine blade, which overcomes or ameliorates at least one of the disadvantages of the prior art or which provides a useful alternative.

Thus, according to a first aspect, the invention provides a blade for a rotor of a wind turbine having a substantially horizontal rotor shaft, said rotor comprising a hub, from which the blade extends substantially in a radial direction when mounted to the hub, the blade having a longitudinal direction with a tip end and a root end and a transverse direction as well as having a blade length. The blade further comprises a profiled contour including a pressure side and a suction side, as well as a leading edge and a trailing edge with a chord having a chord length extending there between, the profiled contour, when being impacted by an incident airflow, generating a lift. The blade is assembled from an inboard blade part closest to the hub and an outboard blade part farthest from the hub. The inboard part comprises a load carrying structure with a first aerodynamic shell fitted to the load carrying structure, and the outboard part comprises a blade shell with a load carrying structure integrated in the blade shell.

Basically, the blade design combines two schools of blade building, viz. the technology of designing the load carrying structure as a spar or beam and then mounting a thin aerodynamic shell to that spar and beam, and the technology of integrating the load carrying structure in to the blade shell, e.g. in form of an integrated spar cap or principal laminate. This combined design has the advantage that the inboard part of the blade, which has to carry the majority of the weight of the blade, is optimised with respect to strength and taking up loads. At the same time, the outboard part, which sweeps a larger area due to the larger distance from the centre of the rotor, is optimised with respect to the aerodynamic shape and thus optimises the energy yield produced, since it is easier to control the aerodynamic shape during manufacture of the blade by implementing the load carrying structure in the blade shell.

Further, it is seen that the blade may be assembled from a conventional blade forming at least part of the outboard blade part of the blade and an inboard blade part in order to form a larger blade. Thereby, the inboard blade part and the outboard blade part may be manufactured separately, meaning that individual moulds can be smaller, which in turn means that the individual parts may be manufactured at smaller factories. Further, the blade parts may be transported separately to the erection site of the wind turbine, facilitating easier and cheaper transport of the blade.

Further, it is clear that the inboard part and the outboard part form different longitudinal parts of the assembled blade, and that the total blade length is longer than individual lengths of the two blade parts. Correspondingly, it is clear that the inboard part and the outboard part are assembled at an assembly boundary that is located at a distance, i.e. with a spacing, from the root end of the blade (or correspondingly at a distance from the hub of the wind turbine). In a preferred embodiment, the inboard part and the out-board part are assembled at a boundary that extends substantially in a chordal plane of the wind turbine blade or substantially in a transverse cross-section of the blade.

According to a first embodiment, the load carrying structure of the inboard blade part is a spar or a beam. The load carrying structure of the inboard blade part may be formed with a substantially circular cross section, such as one being formed as a cylinder.

The beam may advantageously have been manufactured separately, e.g. by filament winding. The beam may also comprise substantially oval or elliptical shaped parts. Further, the shape of the beam may be varying in the longitudinal direction. The aerodynamic shell may for instance be attached to the load carrying structure by bonding and/or over-lamination.

The load carrying structure of the inboard part may be made of steel, aluminium, or fibre-reinforced polymer, e.g. glass or carbon fibre reinforced polymer or a combination thereof. The fibres could also be steel fibres, plant fibres or the like.

The load carrying structure of the outboard blade part may advantageously be a principal laminate integrated in the shell, also called a main laminate. Such a principal laminate typically comprises a high number of fibre layers, e.g. 20-50 layers, embedded in a cured resin. Advantageously, the outboard blade part comprises a first blade part comprising a pressure side shell part with a pressure side principal laminate, and a suction side shell part with a suction side principal laminate. The shell parts may be manufactured separately and later glued together, e.g. along bonding lines along the leading edge and trailing edge of said shell parts. Alternatively, they can be manufactured in a closed mould setup in one infusion process.

In another advantageous embodiment, at least one shear web is mounted between the pressure side principal laminate and the suction side principal laminate.

In a particularly advantageous embodiment, the outboard blade part is made as a fibre-reinforced structure, e.g. comprising glass or carbon fibres or a combination thereof. The fibres could also be steel fibres, plant fibres or the like.

In yet another advantageous embodiment, the outboard blade part is pitchable in relation to the inboard blade part. In other words a pitch bearing is located at the boundary between the inboard blade part and the outboard blade part, and provides for the option of a partial pitched wind turbine blade. This puts less demand on the pitching system, as only the outboard part of the blade need to be pitched and thus a lower weight. This is sufficient for power regulating the operation of the wind turbine. The blade may of course also be provided with a second pitch bearing at the root end of the assembled blade, so that the entire blade may be pitched.

According to one advantageous embodiment, a profiled contour of the inboard blade part is substantially flushed with a profiled contour of the outboard blade part in a zero pitch position of the blade. Thus, if the blade is partially pitched, then the profiled contours flush with each other for a blade pitch angle of zero degrees. For a fully pitched blade, the profiled contours flush with each other in all pitch positions. This provides for an embodiment, where a gradual transition in loading is achieved and further provides for an aesthetic appearance of the blade.

In another embodiment, an assembly plane between the inboard blade part and the outboard blade part form an acute angle with a root plane of the inboard blade part. The acute angle is preferably arranged so that the outboard blade part is coned out of the rotor plane, when the blade is installed on a wind turbine, advantageously so that the blade tip to tower clearance is increased. The acute angle advantageously lies in an interval from 0.5 degrees to 10 degrees, or 0.5 to 5 degrees, or 1 to 5 degrees.

In yet another embodiment, a length of the outboard part is between 60% and 85% of the length of the blade, advantageously between 60% and 80%, more advantageously 65% to 80%, and even more advantageously 65% to 75%.

The blade length is advantageously at least 40 meters, or at least 45 meters, or at least 50 meters, or at least 55 meters, or at least 60 meters.

The first aerodynamic shell of inboard blade part may also be made of a fibre-reinforced polymer material, e.g. with glass or carbon fibres or a combination thereof. The fibres could also be steel fibres, plant fibres or the like. Further, the shell may also comprise a sandwich core material, such as balsawood or foamed polymer.

In one embodiment, a longitudinal centre axis of the blade is displaced from a longitudinal centre axis of the outboard blade part.

According to a second aspect, the invention provides a wind turbine comprising a number, preferably two or three, of blades according to any of the preceding claims, the blades extending substantially radially from a hub on a main shaft having a substantially horizontal centre axis, the blades together with the hub constituting a rotor with a rotor plane, and which can be put into rotation by wind. Advantageously, the wind turbine is upwind configured. Advantageously, the wind turbine is pitch controlled and/or power regulated.

According to a third aspect, the invention provides a method of manufacturing a blade, wherein the method comprises the steps of: a) manufacturing a load carrying structure for an inboard blade part, b) connecting a first aerodynamic shell to the load carrying structure of the inboard blade part, c) manufacturing an outboard blade part with a blade shell having an integrated load carrying structure, and d) connecting the out-board blade part to the inboard blade part.

According to a first additional aspect, the invention provides a blade for a rotor of a wind turbine having a substantially horizontal rotor shaft, said rotor comprising a hub, from which the blade extends substantially in a radial direction when mounted to the hub, the blade having a longitudinal direction with a tip end and a root end and a transverse direction as well as having a blade length. The blade further comprises: a profiled contour including a pressure side and a suction side, as well as a leading edge and a trailing edge with a chord having a chord length extending there between, the profiled contour, when being impacted by an incident airflow, generating a lift. The profiled contour comprises: a root region having a substantially circular or elliptical profile closest to the hub, and an airfoil region having a lift-generating profile furthest away from the hub, the blade further comprising a first shoulder defining a maximum chord of the blade and having a first shoulder width. The blade is assembled from an inboard blade part closest to the hub and an outboard blade part farthest from the hub. The outboard blade part in turn includes a first blade part comprising: a profiled contour including a pressure side and a suction side, as well as a leading edge and a trailing edge with a chord extending there between, wherein the profiled contour of the outboard blade part is divided into: a root region having a substantially circular or elliptical profile closest to the hub, an airfoil region having a lift-generating profile furthest away from the hub, and a transition region between the root region and the airfoil region, the transition region having a profile gradually changing in the radial direction from the circular or elliptical profile of the root region to the lift-generating profile of the airfoil region, and with a second shoulder defining a maximum chord of the first blade part and having a second shoulder width located at the boundary between the transition region and the airfoil region. The first shoulder is located nearer to the hub than the second shoulder, and the first shoulder width is larger than the second shoulder width.

Thus, it is seen that the blade may be assembled from a conventional blade forming at least part of the outboard blade part of the blade and an inboard blade part in order to form a larger blade having a conventional design optimised with respect to aerodynamic performance and loads. Thereby, the inboard blade part and the outboard blade part may be manufactured separately, meaning that individual moulds can be smaller, which in turn means that the individual parts may be manufactured at smaller factories.

Further, the blade parts may be transported separately to the erection site of the wind turbine, facilitating easier and cheaper transport of the blade. This also opens up for the possibility of using existing blades or blade designs and the existing moulds for manufacturing the first blade part or outboard blade part of the blade, which means that the investment for additional moulds and the inboard part will be lower.

The blade may advantageously comprise a transition region between the root region and the airfoil region, the transition region having a profile gradually changing in the radial direction from the circular or elliptical profile of the root region to the lift-generating profile of the airfoil region, and where the first shoulder is located at the boundary between the transition region and the airfoil region. Thereby, it is seen that the assembled blade has a design corresponding to a conventional blade with a root region, transition region, and airfoil region.

Advantageously, the chord length is continuously increasing from the tip end to the position of the first shoulder. The assembled blade may comprise a section with a substantially constant chord, but the assembled blade comprises no sections between the blade tip and the position of the first shoulder where the chord length is decreasing in a direction towards the root end of the assembled blade.

According to one advantageous embodiment, the first shoulder is located at the inboard blade part of the blade. According to a particularly advantageous embodiment, the inboard blade part comprises a load carrying structure and a first aerodynamic shell fitted to the load carrying structure. The load carrying structure of the inboard blade part may comprise a substantially circular cross section, such as one being formed as a cylinder.

In yet another advantageous embodiment, the blade comprises a second aerodynamic shell fitted to the transition region and the root region of the first blade part. This second aerodynamic transition may be used to form a smooth transition between profiled contour of the first blade part and the profiled contour of the inboard blade part. The second aerodynamic shell may be fitted to the trailing edge of the blade and in extension from the second shoulder. Alternatively, the first aerodynamic shell and the second aerodynamic shell may be formed as a unitary part, thus being part of the inboard shell part.

The load carrying structure of the inboard part may also in principle be integrated into a blade shell, e.g. as principle or main laminates of the structure.

According to another advantageous embodiment, the inboard blade part comprises a blunt trailing edge.

According to a particularly advantageous embodiment, the outboard blade part is pitchable in relation to the inboard blade part. In other words a pitch bearing is located at the boundary between the inboard blade part and the outboard blade part, and provides for the option of a partial pitched wind turbine blade. This puts less demand on the pitching system, as only the outboard part of the blade need to be pitched, and thus a lower weight or mass. This is sufficient for power regulating the operation of the wind turbine. The blade may of course also be provided with a second pitch bearing at the root end of the assembled blade, so that the entire blade may be pitched.

In embodiments, where an aerodynamic shell is fitted to blade parts, it may be advantageous to form the first aerodynamic shell and the second aerodynamic shell as separate shell parts, so that the second aerodynamic shell may be pitched in relation to the first aerodynamic shell. Accordingly, the first aerodynamic shell and the second aerodynamic shell are divided in a pitch plane between the inboard blade part and the outboard blade part.

The ends of the first aerodynamic shell and the second aerodynamic shell are preferably closed by a bulkhead or the like.

In yet another advantageous embodiment, a profiled contour of the inboard blade part substantially flushes with a profiled contour of the outboard blade part in a zero pitch position of the blade. Thus, if the blade is partially pitched, then the profiled contours flush with each other for a blade pitch angle of zero degrees. For a fully pitched blade, the profiled contours flush with each other in all pitch positions.

In one embodiment, the outboard blade part is prebent or prestressed in a flapwise direction, e.g. forwardly curved so as to increase tip-to-tower clearance of an upwind configured horizontal wind turbine. In such an embodiment, the blade is curved towards the pressure side of the blade, i.e. being curved so that the blade when installed on an upwind wind turbine will curve away from a tower of the wind turbine, at least at relative low wind speeds. In operation at for instance the design wind speed, the blades are straightened due to the force of the incoming wind and the pressure distribution on the pressure side (or correspondingly the upwind or windward side) of the blade and the suction side (or correspondingly the downwind or leeward side) of the blade, respectively, thus maximising the area swept by the blade in a rotor plane. A prebent blade makes it possible to lower the stiffness of the blade even further, thereby reducing the material needed and consequently also the loading of the blade.

A length of the outboard part may be between 60% and 85% of the length of the blade, advantageously between 60% and 80%, more advantageously 65% to 80%, and even more advantageously 65% to 75%.

The length of the blade is advantageously at least 40 meters, or at least 45 meters, or at least 50 meters, or at least 55 meters, or at least 60 meters.

According to a second additional aspect, the invention provides wind turbine comprising a number, preferably two or three, of blades according to any of the aforementioned embodiments, the blades extending substantially radially from a hub on a main shaft having a substantially horizontal centre axis, the blades together with the hub constituting a rotor with a rotor plane, and which can be put into rotation by wind. Advantageously, the wind turbine is upwind configured. Advantageously, the wind turbine is pitch controlled and/or power regulated.

According to a third additional aspect, the invention provides a method of manufacturing a blade. The method comprises the steps of: a) manufacturing a first blade part having a profiled contour including a pressure side and a suction side, as well as a leading edge and a trailing edge with a chord extending there between, wherein the profiled contour of the outboard blade part is divided into a root region having a substantially circular or elliptical profile closest to the hub, an airfoil region having a lift-generating profile furthest away from the hub, and a transition region between the root region and the airfoil region, the transition region having a profile gradually changing in the radial direction from the circular or elliptical profile of the root region to the lift-generating profile of the airfoil region, and with a second shoulder having a second shoulder width and located at the boundary between the transition region and the airfoil region, b) manufacturing an inboard blade part, and c) connecting the first blade part to the inboard blade part so as to form the blade having an overall blade profile with a profiled contour including a pressure side and a suction side, as well as a leading edge and a trailing edge with a chord having a chord length extending there between, the profiled contour, when being impacted by an incident airflow, generating a lift, wherein the profiled contour comprises: a root region having a substantially circular or elliptical profile closest to the hub, and an airfoil region having a lift-generating profile furthest away from the hub, the blade further comprising a first shoulder defining a maximum chord of the blade and having a first shoulder width, wherein the first shoulder is located nearer a root end of the blade than the second shoulder, and wherein the first shoulder width is larger than the second shoulder width.

The first shoulder width is advantageously at least 5% larger than the second shoulder width, or at least 10%, 15%, 20%, or even at least 25% larger than the second shoulder width.

BRIEF DESCRIPTION OF THE DRAWINGS

The invention is explained in detail below with reference to an embodiment shown in the drawings, in which.

DETAILED DESCRIPTION OF THE INVENTION

Figure 1:
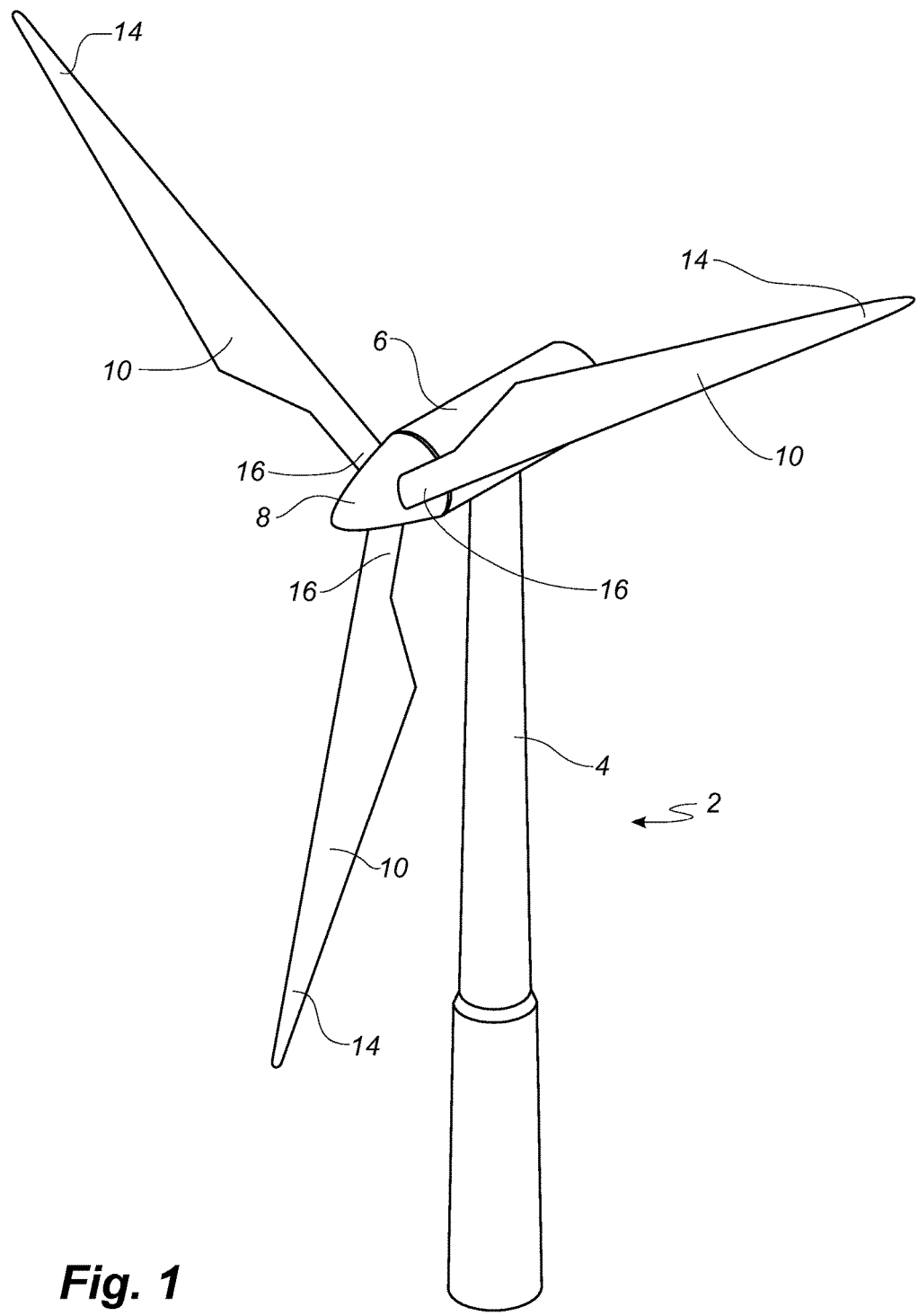
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R. However, the blade 10 according to the invention may also be used for a two-bladed, preferably upwind configured, wind turbine.

Figure 2:
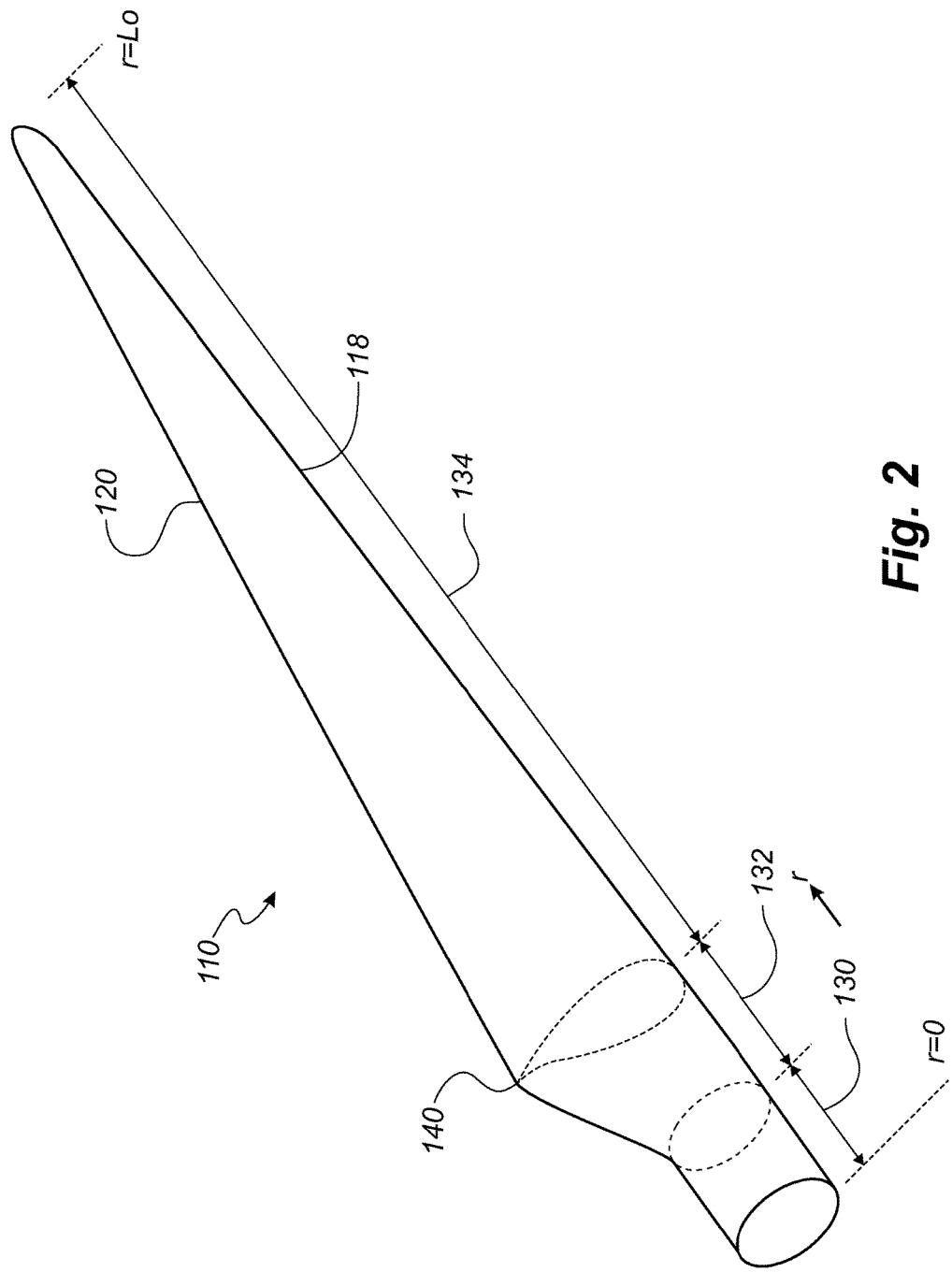
FIG. 2 shows a schematic view of an outboard blade part according to the invention.

FIG. 2 shows a schematic view of a conventional wind turbine blade 110 and which is used as a first blade part of an outboard blade part to form a larger wind turbine blade according to the invention. The first blade part 110 has the shape of a conventional wind turbine blade and comprises a root region 130 closest to the hub, a profiled or an airfoil region 134 furthest away from the hub and a transition region 132 between the root region 130 and the airfoil region 134. The first blade part 110 comprises a leading edge 118 facing the direction of rotation of the first blade part 110, and a trailing edge 120 facing the opposite direction of the leading edge 118.

The airfoil region 134 (also called the profiled region) has an ideal or almost ideal blade shape with respect to generating lift, whereas the root region 130 due to structural considerations has a substantially circular or elliptical cross-section, which for instance makes it easier and safer to mount the first blade part 110 to the hub or in the present invention to an inboard blade part of the blade. The diameter (or the chord) of the root region 130 may be constant along the entire root area 130. The transition region 132 has a transitional profile gradually changing from the circular or elliptical shape of the root region 130 to the airfoil profile of the airfoil region 134. The chord length of the transition region 132 typically increases with increasing distance r from the hub. The airfoil region 134 has an airfoil profile with a chord extending between the leading edge 18 and the trailing edge 120 of the first blade part 110. The width of the chord decreases with increasing distance r from the hub.

A shoulder 140 of the first blade part 110 is defined as the position, where the first blade part 110 has its largest chord length. The shoulder 140 is typically provided at the boundary between the transition region 132 and the airfoil region 134.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
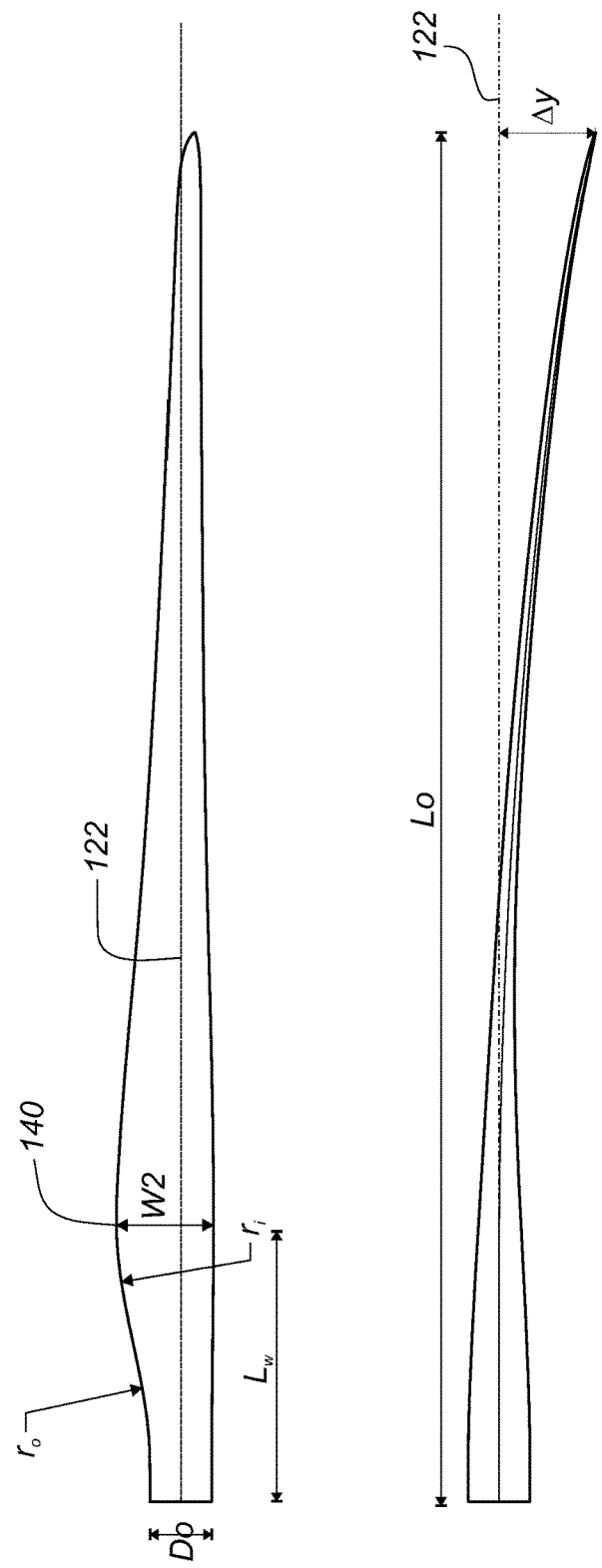
FIG. 3 shows a schematic view of the outboard blade part, seen from above and from the side.

FIG. 3 shows other geometric parameters of the first blade part 110. The outboard part 110 has a total blade length Lo. As shown in FIG. 2, the root end is located at position r=0, and the tip end located at r=Lo. The shoulder 140 of the blade is located at a position r=$L_w$, and has a shoulder width W2, which equals the chord length at the shoulder 140. The diameter of the root is defined as Do. Further, the blade is provided with a prebend, which is defined as Δy, which corresponds to the out of plane deflection from a pitch axis 122 of the first blade part 110.

Figure 4:
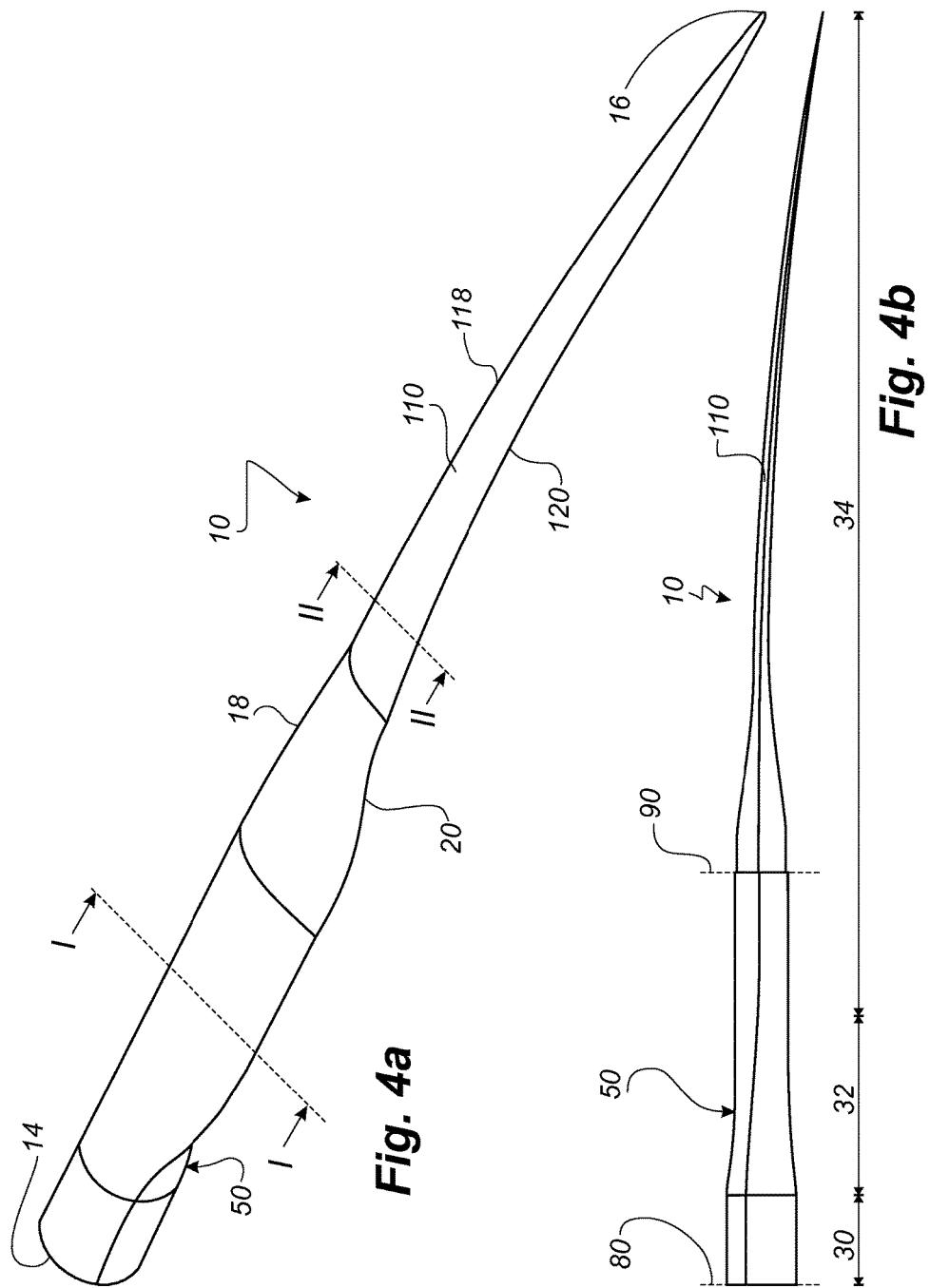
FIGS. 4*a-c* show a first embodiment of a wind turbine blade according to the invention.

FIGS. 4a-c show various views of a blade 10 according to the invention, where FIG. 4a illustrates the blade 10, seen in perspective, FIG. 4b illustrates the blade seen from the side towards the trailing edge of the blade, and FIG. 4c schematically shows the blade seen in a top view above the suction side of the blade. The blade is assembled from an inboard blade part 50 closest to a root end of the blade (or the hub of the wind turbine), and an outboard part farthest from the root end. The outboard blade part comprises a first blade part 110 as described in relation to FIGS. 2 and 3. The inboard blade part comprises a load carrying structure 60 in form of a beam with a first aerodynamic shell 70 fitted to the load carrying structure 60. In addition thereto, a second aerodynamic shell part 148 is fitted to the transition region and the root region of the first blade part 110 in order to achieve a smooth transition between profiled contour of the first blade part 110 and the profiled contour of the inboard blade part 50. The second aerodynamic shell may be fitted to the trailing edge 120 of the first blade part 110 and in extension from the second shoulder 140. Overall, the inboard blade part 50, the first blade part 110, and the second aerodynamic shell 148 provide a conventional design with a tip end 16 and a root end 14, where the blade 10 comprises a profiled contour including a pressure side and a suction side, as well as a leading edge 18 and a trailing edge 20 with a chord having a chord length extending there between, the profiled contour, when being impacted by an incident airflow, generating a lift. Similar to the first blade part 110, the profiled contour of the blade 10 also comprises: a root region 30 having a substantially circular or elliptical profile closest to the hub, an airfoil region 34 having a lift-generating profile furthest away from the hub, and a transition region 32 between the root region 30 and the airfoil region 34, the transition region 32 having a profile gradually changing in the radial direction from the circular or elliptical profile of the root region to the lift-generating profile of the airfoil region. The blade 10 further comprises a first shoulder 40 defining a maximum chord of the blade and having a first shoulder width W1. The first shoulder 40 is advantageously located at the boundary between the transition region 32 and the airfoil region 34. As can be seen from the figure, the first shoulder 40 is located further inboard than the second shoulder 140, and the first shoulder width W1 is larger than the second shoulder width W2, and preferably at least 10% larger than the second shoulder width W2.

Thus, it is seen that the blade may be assembled from a conventional blade 110 forming at least part of the outboard blade part of the blade, and an inboard blade part 50 in order to form a larger blade 10 having a conventional design optimised with respect to aerodynamic performance and loads. Thereby, the inboard blade part 50 and the outboard blade part may be manufactured separately, meaning that individual moulds can be smaller, which in turn means that the individual parts may be manufactured at smaller factories. Further, the blade parts may be transported separately to the erection site of the wind turbine, facilitating easier and cheaper transport of the blade. This also opens up for the possibility of using existing blades or blade designs and the existing moulds for manufacturing the first blade part or outboard blade part of the blade, which means that the investment for additional moulds and the inboard part will be lower.

The blade 10 may have a blade section around the first shoulder 40, where the chord length is substantially constant.

The length Lo of the outboard blade part and first blade part 110 is advantageously around 60% to 70% of a total blade length L of the blade 10, e.g. around 65% for a blade having a total blade length of 60-70 meters.

The blade 10 is advantageously divided between the outboard blade part and the inboard blade part 50 and also advantageously provided with a pitch bearing provided between the two parts, so that the outboard blade part may be pitched in relation to the inboard blade part 50. Thereby, the blade comprises a root plane or hub plane 80 at the root end 16 of the blade 10, and a pitch plane 90 in the interface between the inboard blade part 50 and the outboard blade part. The blade may also comprise a pitch bearing at the root end 16 of the blade 10 so that the entire blade may be pitched. A centre, longitudinal axis 85 of the inboard blade part may be displaced from a pitch axis 95 of the outer blade part, alternatively the two axes may be coinciding.

In one embodiment, the root plane 80 and the pitch plane 90 cross each other in an acute angle. If the acute angle is formed in the view seen in FIG. 4b, the angle may advantageously be formed so that the outboard blade part cones in relation to the inboard blade part, thereby adding to the tip to tower clearance in addition to the prebending or prestressing of the blade. The acute angle may advantageously lie in an interval between 1 and 5 degrees.

Figure 5:
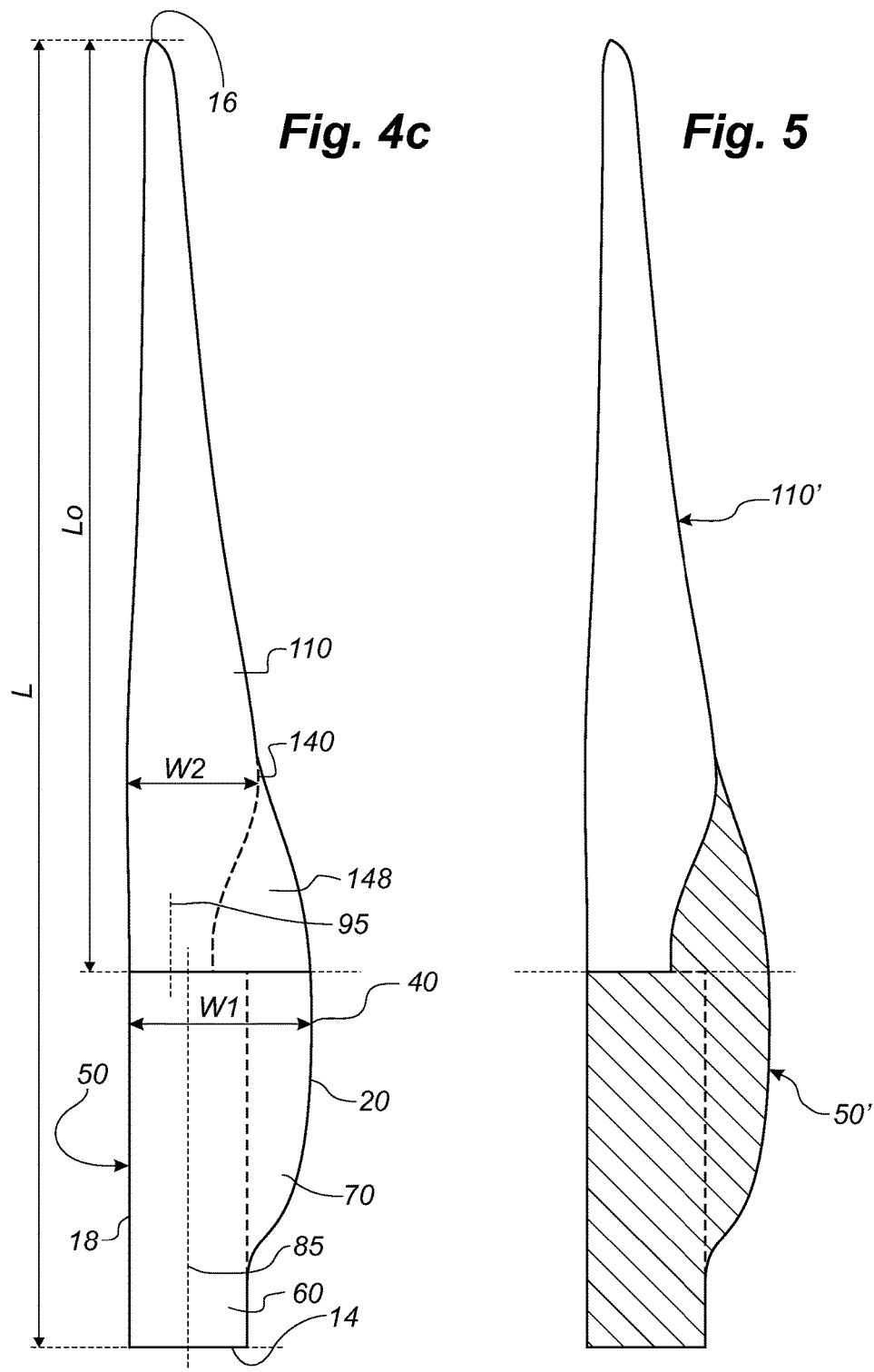
FIG. 5 shows a second embodiment of a wind turbine blade according to the invention.

In an alternative embodiment, the second shell part 148 is integrally formed with the first aerodynamic shell and is not connected to the first blade part 110. Such an embodiment is shown in FIG. 5. In the illustrated embodiment, the hatched part forms an inboard blade part 50', which is connected to an outboard blade part 110' which corresponds to the first blade part 110 of the first embodiment. If this embodiment is provided with a pitch bearing between the two parts, then only the outboard blade part 110' is pitched in relation to the inboard blade part 50'. Further, it is seen that a part of the aerodynamic shell of the inboard blade part 50' protrudes beyond the pitch bearing between the two parts.

Figure 6:
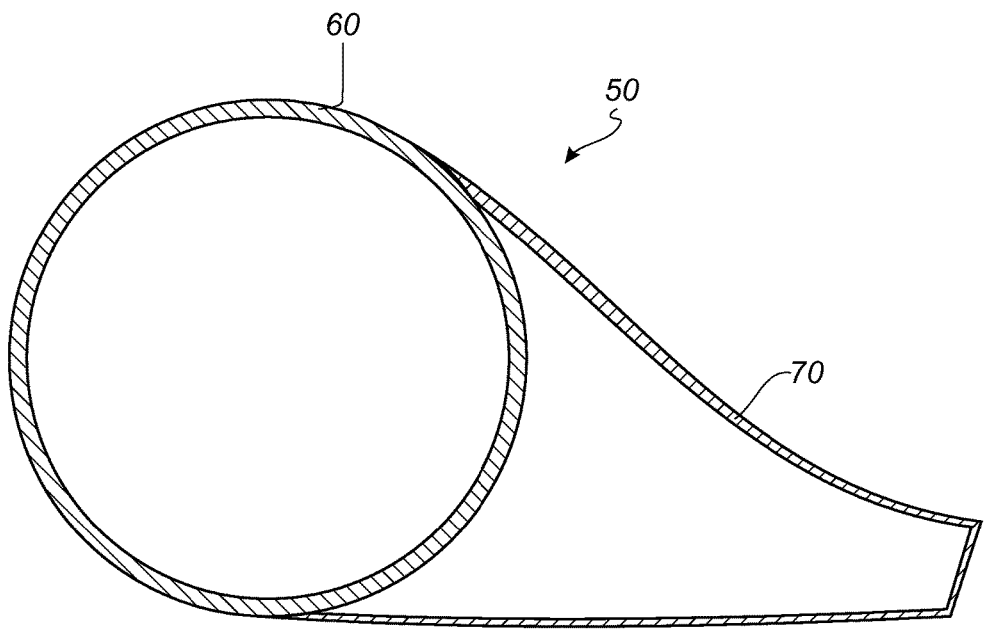
FIG. 6 shows a cross sectional view along line I-I of FIG. 4*a*.

FIG. 6 shows a cross section through the inboard blade part 50 along the line I-I of FIG. 4a. The inboard blade part 50 comprises a load carrying structure in form of a circular beam 60 made in glass-fibre reinforced polymer. A thin aerodynamic shell 70, also made in glass-fibre reinforced polymer, is fitted to the load carrying structure 60.

Figure 7:
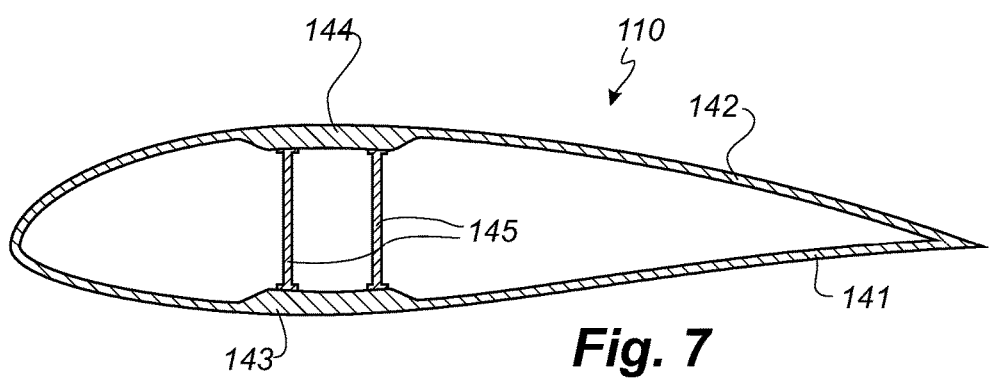
FIG. 7 shows a cross sectional view along line II-II of FIG. 4*a*.

FIG. 7 shows a cross section through the first blade part 110 along the line II-II of FIG. 4a. It is seen that the cross-section of the first blade part 110 is shaped like an airfoil with a pressure side shell part 141 and a suction side shell part 142. The pressure side shell part comprises a load carrying structure in form of a principle or main laminate 143 integrated into the pressure side shell part 141. Similarly, the suction side shell part 142 comprises a load carrying structure in form of a principle or main laminate 144 integrated into the suction side shell part 141. The blade shells 141, 142 are made in glass-fibre reinforced polymer, and the load carrying structures 143, 144 comprise a large number of glass-fibre layers, e.g. 20-50 layers. Two shear webs 145 are connected between the pressure side principal laminate 143 and suction side principle laminate 144.

Basically, the blade design combines two schools of blade building, viz. the technology of designing the load carrying structure as a spar or beam and then mounting a thin aerodynamic shell to that spar and beam, and the technology of integrating the load carrying structure in to the blade shell, e.g. in form of an integrated spar cap or principal laminate. This combined design has the advantage that the inboard part of the blade, which has to carry the majority of the weight of the blade, is optimised with respect to strength and taking up loads. At the same time, the outboard part, which sweeps a larger area due to the larger distance from the centre of the rotor, is optimised with respect to the aerodynamic shape and thus optimises the energy yield produced, since it is easier to control the aerodynamic shape during manufacture of the blade by implementing the load carrying structure in the blade shell.

The invention has been described with reference to a preferred embodiment. However, the scope of the invention is not limited to the illustrated embodiment, and alterations and modifications may be carried out without deviating from the scope of the invention, which is defined by the following claims.

| List of reference numerals | |
|---|---|
| 2 | wind turbine |
| 4 | tower |
| 6 | nacelle |
| 8 | hub |
| 10 | blade |
| 14 | blade tip |
| 16 | blade root |
| 18 | leading edge |
| 20 | trailing edge |
| 30 | root region |
| 32 | transition region |
| 34 | airfoil region |
| 50 | inboard blade part |
| 60 | load carrying beam structure |
| 70 | first aerodynamic shell |
| 72 | blunt trailing edge |
| 80 | hub plane/root plane |
| 85 | centre longitudinal axis |
| 90 | pitch plane |
| 95 | pitch axis of outer blade part |
| 110 | first blade part of outboard blade part |
| 118 | leading edge |
| 120 | trailing edge |
| 122 | pitch axis |

| List of reference numerals | |
|---|---|
| 130 | root region |
| 132 | transition region |
| 134 | airfoil region |
| 141 | pressure side shell |
| 142 | pressure side principal laminate/main laminate |
| 143 | suction side shell |
| 144 | suction side principal laminate/main laminate |
| 145 | shear webs |
| 148 | second shell part |
| L | blade length |
| W1 | shoulder width of blade |
| W2 | shoulder width of outboard blade part |
| Δy | prebend |

The invention claimed is:

1. A blade (10) for a rotor of a wind turbine (2) having a substantially horizontal rotor shaft, said rotor comprising a hub (8), from which the blade (10) extends substantially in a radial direction when mounted to the hub (8), the blade having a longitudinal direction (r) with a tip end (16) and a root end (14) and a transverse direction as well as having a blade length (L), the blade further comprising:
 a profiled contour including a pressure side and a suction side, as well as a leading edge (18) and a trailing edge (20) with a chord having a chord length (c) extending there between, the profiled contour, when being impacted by an incident airflow, generating a lift, wherein
 the blade is assembled from an inboard blade part (50) closest to the hub and an outboard blade part (110) farthest from the hub, wherein
 the inboard blade part (50) comprises a load carrying structure (60) in a form of a spar or a beam with a first aerodynamic shell (70) mounted to the spar or beam, and
 the outboard blade part (110) comprises a blade shell (141, 143) with a load carrying structure (142, 144) in a form of a principal laminate integrated in the blade shell (141, 143);
 wherein the outboard blade part is pitchable in relation to the inboard blade part, and
 wherein a profiled contour of the inboard blade part substantially flushed with a profiled contour of the outboard blade part in a zero pitch position of the blade.

2. The blade according claim 1, wherein the load carrying structure of the inboard blade part is made of steel, aluminium, or fibre-reinforced polymer.

3. The blade according to claim 1, wherein the outboard blade part comprises a first blade part comprising a pressure side shell part with a pressure side principal laminate, and a suction side shell part with a suction side principal laminate.

4. The blade according to claim 3, wherein at least one shear web is mounted between the pressure side principal laminate and the suction side principal laminate.

5. The blade according to claim 1, wherein the outboard blade part is made as a fibre-reinforced structure.

6. The blade according to claim 1, wherein an assembly plane between the inboard blade part and the outboard blade part form an acute angle with a root plane of the inboard blade part.

7. The blade according to claim 1, wherein a length of the outboard part is between 60% and 85% of the length (L) of the blade.

8. The blade according to claim 7, wherein the length of the outboard blade part is between 60% and 80% of the length (L) of the blade.

9. The blade according to claim 8, wherein the length of the outboard blade part is between 65% and 80% of the length (L) of the blade.

10. The blade according to claim 9, wherein the length of the outboard blade part is between 65% and 75% of the length (L) of the blade.

11. The blade according to claim 1, wherein the first aerodynamic shell of the inboard blade part is made of a fibre-reinforced polymer material.

12. The wind turbine blade according to claim 1, wherein a longitudinal centre axis of the blade is displaced from a longitudinal centre axis of the outboard blade part.

13. A wind turbine, comprising:

a plurality of blades, each said blade having a longitudinal direction (r) with a tip end (16) and a root end (14) and a transverse direction as well as having a blade length (L), each said blade further comprising:

a profiled contour including a pressure side and a suction side, as well as a leading edge (18) and a trailing edge (20) with a chord having a chord length (c) extending therebetween, the profiled contour, when being impacted by an incident airflow, generating a lift, wherein each said blade is assembled from an inboard blade part (50) closest to the hub and an outboard blade part (110) farthest from the hub, wherein the inboard blade part (50) comprises a load carrying structure (60) in a form of a spar or a beam with a first aerodynamic shell (70) mounted to the spar or beam, and the outboard blade part (110) comprises a blade shell (141, 143) with a load carrying structure (142, 144) in a form of a principal laminate integrated in the blade shell (141, 143), wherein the outboard blade part is pitchable in relation to the inboard blade part, and wherein a profiled contour of the inboard blade part substantially flushed with a profiled contour of the outboard blade part in a zero pitch position of the blade; and a hub on a main shaft having a substantially horizontal centre axis, wherein the plurality of blades extend substantially radially from the hub, the blades together with the hub constituting a rotor with a rotor plane.

14. The wind turbine of claim 13, wherein the number of blades is two or three.

15. A method of manufacturing a blade, wherein the method comprises the steps of:

a) manufacturing a load carrying structure (60) in a form of a spar or a beam for an inboard blade part (50), b) connecting a first aerodynamic shell (70) to the load carrying structure of the inboard blade part, wherein the first aerodynamic shell (70) is mounted to the spar or beam, c) manufacturing an outboard blade part (110) with a blade shell (141, 143) having an integrated load carrying structure (142, 144) in a form of a principal laminate, and d) connecting the outboard blade part (110) to the inboard blade part (50);

wherein the outboard blade part is pitchable in relation to the inboard blade part, and wherein a profiled contour of the inboard blade part substantially flushed with a profiled contour of the outboard blade part in a zero pitch position of the blade.

* * * * *